2,478,392

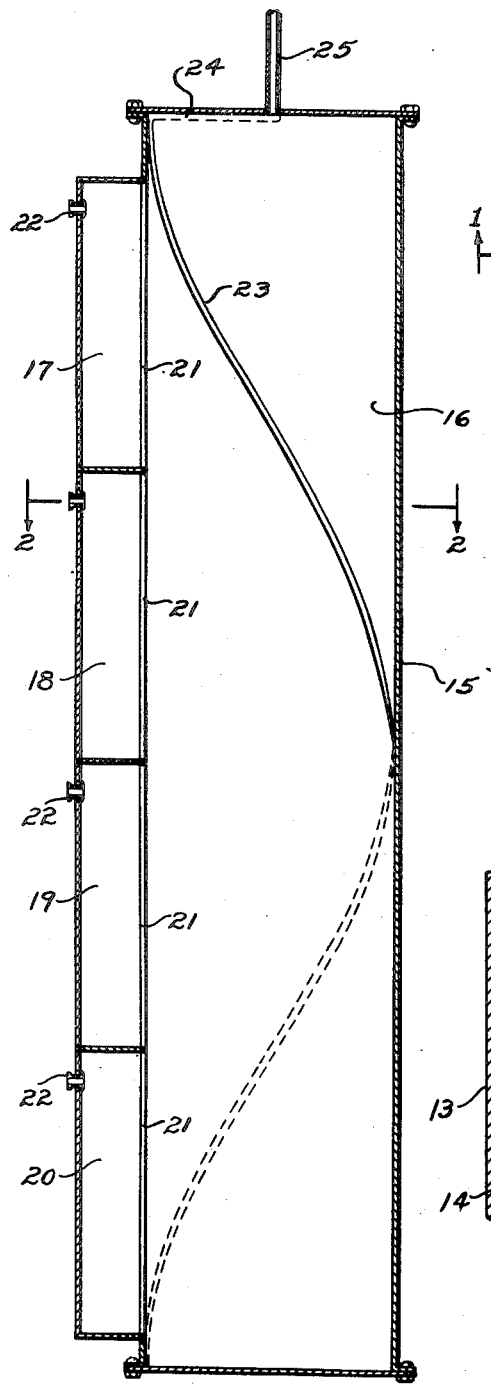
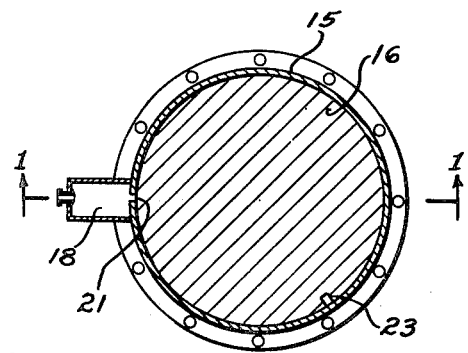
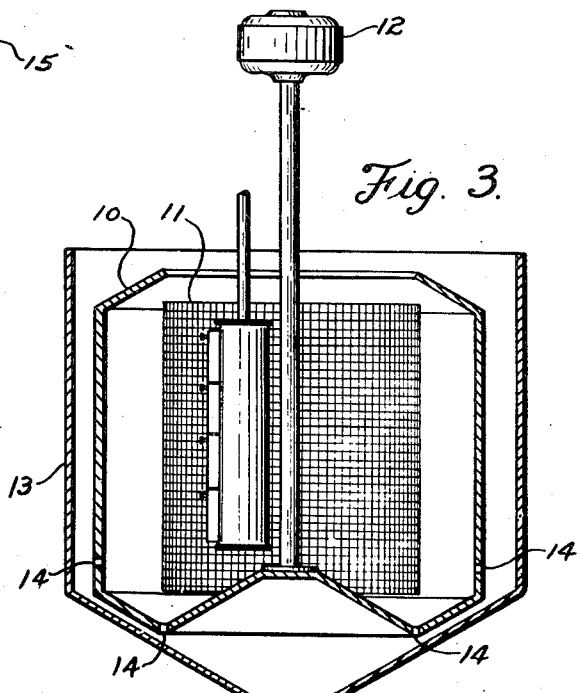
Fig. 1.
Fig. 2.
Fig. 3.
INVENTOR.
WILBUR A. HARRISON
BY
Hazard & Miller
Attorneys Patented Aug. 9, 1949

UNITED STATES PATENT OFFICE 2,478,392

STACCATO WASHER FOR CENTRIFUGALS AND THE LIKE

Wilbur A. Harrison, Santa Paula, Calif., assignor of one-half to Leslie A. Rawson and Wanda F. Rawson, Los Angeles, Calif.

Application January 24, 1947, Serial No. 724,070

2 Claims. (Cl. 299—27)

1

This invention relates to a means and method of washing substances that are washed and dried in centrifugals.

In many industries where substances are washed and dried they are placed in centrifugals which whirl the substances to throw off surrounding liquids by centrifugal action. This is particularly true where various salts are recovered from brines by crystallization. When the crystals are formed in the brines they are placed in a centrifugal which, in its operation, throws off the surrounding brine under centrifugal action and thereafter wash water or a washing liquid may be introduced into the centrifugal to wash the remaining brine from the surfaces of the crystals. It is desirable to use only a minimum amount of wash water or washing liquid to wash the brine from the crystals in that the wash water used for this purpose dilutes the brine and must be subsequently evaporated off in order to recover further crystals from the recovered brine. Also, there may be some danger of the wash water redissolving the crystals in the centrifuge. Dilution of the brine by the added wash water is usually, however, the most serious consequence.

I have found that crystals recovered from brines by crystallization may be most satisfactorily washed in a centrifugal by introducing the wash water or washing liquid into the centrifugal in the nature of short or interrupted spurts rather than in the form of a continuous stream. When the wash water or washing liquid is discharged into the centrifugal in the form of a multiplicity of short or interrupted spurts, this wash water tends to force the brine adhering to the crystals through the crystalline mass and through the perforated walls of the centrifugal ahead of it with a minimum amount of dilution or admixture therewith. In other words, the wash water then tends to push the brine through the crystalline mass with a greater mechanical action which is adequate to effectively clean the crystals.

It is an object of the present invention to provide an improved centrifugal wherein there is a means for discharging the wash water or washing liquid in the form of a series of short, interrupted spurts whereby the brine adhering to the crystals will be effectively removed therefrom and at the same time a minimum amount of wash water will be utilized so that the brine removed from the crystals will not be unnecessary diluted.

Another object of the invention is to provide a device for releasing wash water or washing liquid into a centrifugal which will release the

2 water and cause it to be discharged in a series of staccato-like spurts.

With the foregoing and other objects in view, which will be made manifest in the following detailed description and specifically pointed out in the appended claims, reference is had to the accompanying drawings for an illustrative embodiment of the invention, wherein:

Figure 1 is a vertical section through the washer embodying the present invention;

Fig. 2 is a horizontal section taken substantially upon the line 2—2 upon Fig. 1 in the direction indicated; and Fig. 3 is a sectional view through a typical centrifugal, illustrating the washer embodying the present invention as having been installed therein.

Referring to the accompanying drawings wherein similar reference characters designate similar parts throughout, the centrifugal illustrated may conform to any conventional or preferred type of centrifugal wherein an open-topped, cylindrical container 10 has disposed therein perforated or foraminous walls 11. This container, together with its walls 11, is rotated about a vertical axis such as by a motor 12 within a collecting shell 13. The crystals to which brine may adhere are disposed within the centrifugal and are thrown outwardly against the perforated walls 11 by centrifugal action, the brine escaping through the perforations or pores in the screen and passing through suitable outlets 14 into the collecting shell 13 from which the brine may drain.

The washer embodying the present invention consists generally of a cylindrical shell 15 within which there is rotatable a cylinder 16. On the side of the shell 15 there is a series of vertically arranged compartments 17, 18, 19 and 20. Each of these compartments communicates with the interior of the shell 15 by means of vertical slots 21. A jet or nozzle 22 is mounted on the outer wall of each compartment near the top thereof and is directed outwardly or toward the walls of the screen 11. On the exterior of the cylinder 16 there is formed a continuous helical groove 23. This groove is fed with wash water or washing liquid by means of a radial groove 24 at the top of the cylinder which, in turn, is supplied by a supply pipe 25 from any suitable source of supply.

As the groove 23 extends completely around the cylinder 16 one portion of this groove will always be in communication with one of the vertical slots 21 leading to one of the compartments. The wash water or washing liquid which is supplied under pressure flows through the radial groove 24 and down through the helical groove until it finds egress therefrom into one of the compartments. The shape of the helical groove 23 conducting the wash water to a compartment causes the discharging water to act on the cylinder 16 with a reactionary force and thus impart a whirling or rotation of the cylinder. Consequently, during this rotation of the cylinder, groove 23 will momentarily be placed in communication with compartment 17 and subsequently it will be placed in communication with other compartments. During the small time interval that the groove 23 is in communication with the compartment 17 through its slot 21, the pressure of the wash water is effective to cause a short momentary spurt of liquid to be discharged through the jet or nozzle 22. Immediately thereafter the rotating cylinder 16 causes the groove 23 to be disconnected from the compartment 17 and to be placed in communication with another compartment. When compartment 17 is no longer connected to the groove, discharge through its nozzle or jet, of course, ceases and a discharge momentarily takes place through the jet or nozzle of the succeeding compartment that is placed in communication with the helical groove 23. In this manner, on merely turning on the supply of wash water to the pipe 25 a series of vertically spaced momentary spurts of wash water will be discharged into the centrifugal. These small quantities of wash water delivered to the centrifugal in quick succession enable the volume of water released during each spurt to, in effect, push the adhering brine off of the surfaces of the crystals instead of mixing therewith and diluting the brine on the crystals. Consequently the crystals may be effectively washed and dried in the centrifugal without utilizing any great amount of wash water, and the dilution of the brine that is collected in the collecting shell 13 is reduced to a minimum.

It will be readily appreciated that the improved washer is of very simple construction and is automatically operable on merely supplying the wash water under pressure thereto.

Various changes may be made in the details of construction without departing from the spirit and scope of the invention as defined by the appended claims.

I claim:

1. A washer for use in centrifugals and the like comprising a cylindrical shell or housing, a cylinder rotatable therein, said cylinder having a helical groove on the exterior thereof, means for supplying washing liquid under pressure to said groove, means providing a series of compartments on the side of the shell or housing having entrances adapted to be traversed by the groove as the cylinder rotates, and jets leading from said compartments.

2. A washer for use in centrifugals and the like comprising a cylindrical shell or housing, there being a longitudinal slot in the walls of the housing, means defining compartments on the exterior of the housing in communication with said slot, jets leading from said compartments, a cylindrical rotor rotatable within the housing having a helical groove on the exterior thereof arranged to traverse said slot during rotation of the rotor and means for supplying washing liquid to the groove under pressure to be released therefrom through the slot into the compartments and discharged sequentially through the jets.

WILBUR A. HARRISON.

REFERENCES CITED

The following references are of record in the file of this patent:

UNITED STATES PATENTS

| Number | Name | Date |
|---|---|---|
| 311,052 | Anderson | Jan. 20, 1885 |
| 637,258 | Hirt | Nov. 21, 1899 |
| 801,055 | Aldereguia | Oct. 3, 1905 |
| 1,030,973 | Coppage | July 2, 1912 |
| 1,095,887 | Kirby | May 5, 1914 |
| 1,669,927 | Carlson | May 15, 1928 |
| 2,089,906 | Long | Aug. 10, 1937 |
| 2,145,633 | Roberts | Jan. 31, 1939 |
| 2,244,652 | Kochli | June 3, 1941 |
| 2,418,776 | Kopplin | Apr. 8, 1947 |